T. P. WARREN.
Plow Clevis.
No. 78,775.
Patented June 9, 1868.
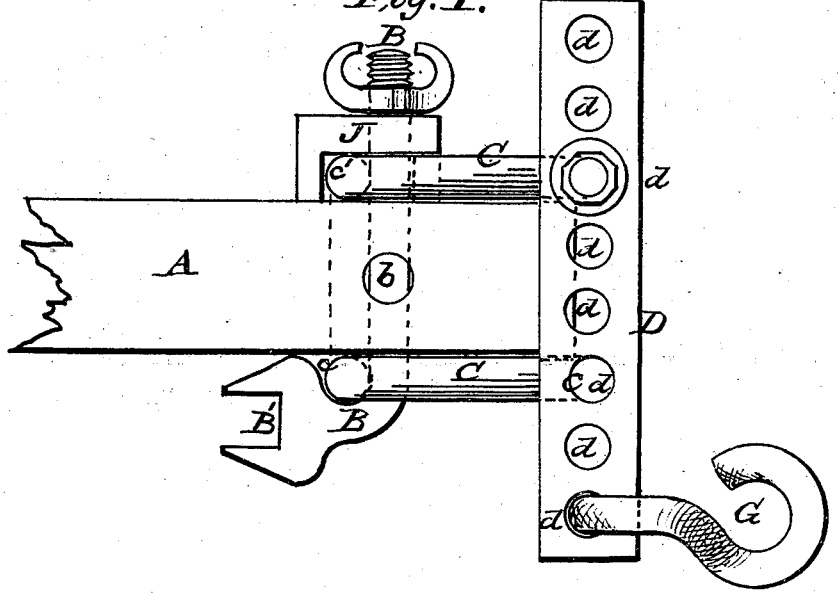
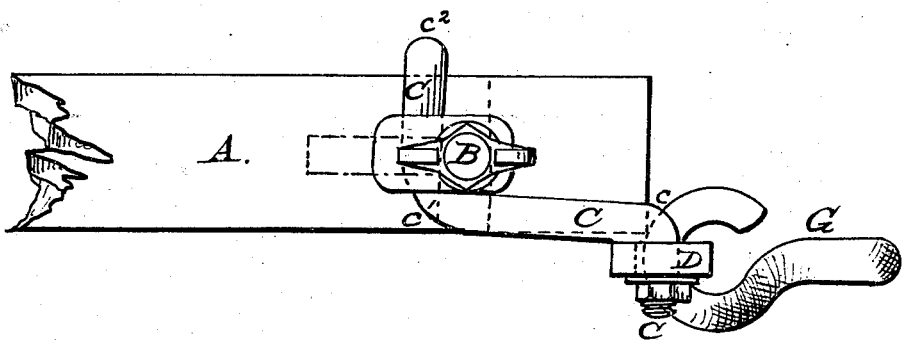
Witnesses:
Inventor:
Thomas P. Warren
per Munn & Co.
Attorneys.

United States Patent Office.

THOMAS P. WARREN, OF NORFOLK, VIRGINIA, ASSIGNOR TO D. W. WARREN.

Letters Patent No. 78,775, dated June 9, 1868.

IMPROVEMENT IN CLEVIS-IRON.

*The Schedule referred to in these Letters Patent and making part of the same.*

TO ALL WHOM IT MAY CONCERN:

Be it known that I, THOMAS P. WARREN, of the city and county of Norfolk, and State of Virginia, have invented a new and improved Clevis-Iron; and I do hereby declare that the following is a full, clear, and exact description of the construction and operation of the same, reference being had to the annexed drawings, making a part of this specification, in which—

Figure 1 is a top view.

Figure 2 is a side elevation.

This invention is a simple, cheap, and durable clevis, that can be attached to a plow-beam of any size, by which the plow can be adjusted more or less " to land," and can be caused to cut a deep or shallow furrow, as may be desired.

The clevises hitherto in use have been defective in this particular, that while they can be employed to regulate the depth to which the plow will cut, they cannot be made to so adjust the draught-chain to the end of the beam as to cause the plow to cut off a wide or narrow strip of the soil, at pleasure. The design of this invention is to remedy that defect, and to provide for public use a clevis which will render the cut of the plow adjustable in every direction.

The want of such a device has long been felt by agriculturists. Without it, the farmer, in plowing among certain crops, is obliged to drive his team so near the standing vegetables as to crush and destroy large quantities of them, and if his plow be constructed for the purpose of plowing among these crops, it will be nearly or quite useless for other crops. In cultivating one kind of crop, the plow must be adjusted so as to run nearer to the vegetables than when another crop is cultivated, and unless some adequate means is provided which can be attached to all kinds of plow-beams and cultivator-beams, whether they be large or small, the farmer must provide himself with a whole set of plows specially constructed for the different purposes required of them.

It is to save this immense expense, and to provide the means whereby the plowman can in a moment change the cut of his plow, that I have invented the device which I will now proceed to describe in detail.

In the drawings, A represents the beam of a plow or cultivator, or the pole of any carriage or instrument to which it may be desired to attach my improved clevis. Near the end of this beam it is provided with a vertical hole, and, crossing it, a lateral hole, through one of which passes the clevis-pin B.

The clevis itself is composed of an iron rod or bar, C, bent at $c$ $c^1$ $c^2$ as shown in the drawings, and when in use resting upon and around the end of the beam, as seen in figs. 1 and 2, and having an iron plate, D, perforated as seen at $d$ $d$ $d$. Attached to its extremities, G, is a double or S-hook, one end of which is hooked into one of the holes $d$ $d$, the other end receiving the draught-chain. By adjusting this hook in the different holes, when the clevis is attached to the beam in such a manner that the plate D is in a vertical position, and the clevis-pin passes through the vertical hole in the beam, as in fig. 1, the plow may be made to cut a deep or a shallow furrow; and by the same means, when the clevis is attached by the lateral hole in the beam, the plate D, being in a horizontal position, as in fig. 2, the plow may be made to take more or less land, at pleasure.

The clevis is locked to the beam by its peculiar form, operating in combination with the pin B, as will be seen in figs. 1 or 2. The shoulders $c^1$ $c^2$ rest against the sides of the beam, or against its upper and under surfaces. The pin is in the angle formed by the bend at that point, and the middle portion of the rod C, between the angles $c^2$ $c^2$, rests against the third side of the beam. The rod C, and the plate D that it supports, are thus securely locked in position, and cannot be moved without taking out the clevis-pin.

The latter may be made in the form shown in fig. 1, having a head, B', formed with jaws, and designed to operate as a wrench, when such an instrument may be needed for any purpose, and having a screw and nut at the opposite end to secure it to the beam. A block or arched rest, J, of the form shown in fig. 1, may be employed to assist the pin in holding the rod C firmly in place.

The ends of the round iron C C may be attached to the flat plate D, by means of screw-nuts $n$ $n$, if desired, so that the plate can be readily and easily removed from the rod, and attached again by other holes $d$ $d$. In this way the plate may be adjusted to one side or the other, according to the number of holes in it, as will be readily understood from the drawings.

Having thus described my invention, what I claim as new, and desire to secure by Letters Patent, is—

1. The combination of the perforated plate D with the bent rod C, when the said parts are constructed to operate in the manner set forth.

2. In combination with a perforated draught-plate D, and a rod or link C, for attaching it to the plow-beam, I claim the screw-nuts $n$ $n$, by which the plate can be adjusted back and forth on the rods or link, so as to cause the plow to run more or less to land, in the manner described..

THOS. P. WARREN.

Witnesses:
    WM. A. SWANK,
    WM. H. WALES.